United States Patent
Riedl et al.

(10) Patent No.: US 9,608,738 B2
(45) Date of Patent: Mar. 28, 2017

(54) SYSTEM AND METHOD FOR BROADBAND DOPPLER COMPENSATION

(71) Applicant: The Board of Trustees of the University of Illinois, Urbana, IL (US)

(72) Inventors: Thomas J. Riedl, Urbana, IL (US); Andrew C. Singer, Champaign, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 742 days.

(21) Appl. No.: 13/844,543

(22) Filed: Mar. 15, 2013

(65) Prior Publication Data
US 2014/0071793 A1    Mar. 13, 2014

Related U.S. Application Data

(60) Provisional application No. 61/731,406, filed on Nov. 29, 2012.

(51) Int. Cl.
*H04B 11/00* (2006.01)
*G01P 3/44* (2006.01)
*H02P 21/18* (2016.01)

(52) U.S. Cl.
CPC ............ *H04B 11/00* (2013.01); *G01P 3/44* (2013.01); *H02P 21/18* (2016.02)

(58) Field of Classification Search
USPC ........................................................ 367/134
See application file for complete search history.

(56) References Cited

U.S. PATENT DOCUMENTS

| | | | | |
|---|---|---|---|---|
| 3,593,256 | A | * | 7/1971 | Gannon .................... 367/134 |
| 4,187,491 | A | * | 2/1980 | Lindstrum et al. ........ 367/125 |
| 5,559,757 | A | * | 9/1996 | Catipovic et al. ......... 367/134 |
| 5,732,113 | A | * | 3/1998 | Schmidl et al. ........... 375/355 |
| 6,130,859 | A | * | 10/2000 | Sonnenschein et al. .... 367/134 |
| 6,272,072 | B1 | * | 8/2001 | Wulich et al. ............. 367/124 |
| 6,442,104 | B1 | * | 8/2002 | Ridgell et al. ............. 367/1 |

(Continued)

FOREIGN PATENT DOCUMENTS

| | | |
|---|---|---|
| WO | 2008157609 | 12/2008 |
| WO | 2008157609 A2 | 12/2008 |

OTHER PUBLICATIONS

Abdelkareem et al., "Time varying Doppler-shift compensation for OFDM-based shallow Underwater Acoustic Communication systems" 2011 8th IEEE International Conference on Mobile Ad-Hoc and Sensor Systems, IEEE, Oct. 17, 2011, pp. 885-891.

(Continued)

*Primary Examiner* — James Hulka
(74) *Attorney, Agent, or Firm* — Guntin & Gust, PLC; Robert Gingher

(57) ABSTRACT

A Doppler compensation system includes a transmitter unit for transmitting a signal, wherein the transmitted signal being associated with an emission time-scale, a receiving unit for receiving a signal, wherein the received signal is associated with a receive time-scale that is not equivalent to the emission time-scale, and a Doppler compensating unit configured to estimate an inverse temporal distortion function, wherein the Doppler compensating unit implements the inverse temporal distortion function to estimate the transmitted signal.

30 Claims, 11 Drawing Sheets

(56) References Cited

U.S. PATENT DOCUMENTS

| | | | |
|---|---|---|---|
| 6,512,720 | B1 | 1/2003 | Yang et al. |
| 6,594,320 | B1* | 7/2003 | Sayeed .................. 375/281 |
| 7,219,032 | B2 | 5/2007 | Spiesberger |
| 7,363,191 | B2 | 4/2008 | Spiesberger |
| 7,844,006 | B2 | 11/2010 | Stojanovic |
| 7,859,944 | B2 | 12/2010 | Zhou et al. |
| 8,467,269 | B2* | 6/2013 | Zhou et al. ............... 367/134 |
| 2006/0146948 | A1* | 7/2006 | Park et al. ............... 375/260 |
| 2007/0177462 | A1 | 8/2007 | Gendron |
| 2008/0157609 | A1 | 7/2008 | Wang |
| 2009/0067514 | A1 | 3/2009 | Stojanovic |
| 2009/0088641 | A1* | 4/2009 | Baba ................ A61B 8/06 600/455 |
| 2009/0129204 | A1* | 5/2009 | Zhou et al. ............... 367/134 |
| 2011/0013487 | A1 | 1/2011 | Zhou et al. |
| 2012/0146834 | A1 | 6/2012 | Karr |
| 2013/0106657 | A1* | 5/2013 | Perthold ................ G01S 5/021 342/387 |

OTHER PUBLICATIONS

Abdelkareem et al., "Compensation of Linear Multiscale Doppler for OFDM-Based Underwater Acoustic Communication Systems" Journal of Electrical and Computer Engineering, vol. 44, No. 1, May 21, 2012, 16 pages.

Gomes et al., "Doppler Compensation in Underwater Channels Using Time-Reversal Arrays" Proceedings of International Conference on Acoustics, Speech and Signal Processing, vol. 5 Apr. 6, 2003, pp. V_81-V_84.

International Search Report and Written Opinion for PCT/US2013/071251, Aug. 7, 2014.

Riedl, et al., "Broadband Doppler Compensation: Principles and New Results" Submission of extended summary to Asilomar conference on Signal Systems, and Computers, May 1, 2011.

Riedl, et al., "Broadband Doppler Compensation: Principles and New Results ver2" Submission of extended summary to Asilomar conference on Signal Systems, and Computers, May 1, 2011.

Riedl, et al., "Broadband Doppler Compensation: Principles and New Results final" Submission of extended summary to Asilomar conference on Signal Systems, and Computers, May 1, 2011.

Riedl, et al., "Broadband Doppler Compensation: Principles and New Results" Presentation at Asilomar conference on Signal Systems, and Computers, Nov. 6-9, 2011.

Riedl, et al., "Broadband Doppler Compensation: Principles and New Results" Submission of extended summary to Asilomar conference on Signal Systems, and Computers, Nov. 6-9, 2011.

Riedl, et al., "Broadband Doppler Compensation: Principles and New Results ver" Submission of extended summary to Asilomar conference on Signal Systems, and Computers, Nov. 6-9, 2011.

Riedl, et al., "Broadband Doppler Compensation: Principles and New Results final" Submission of extended summary to Asilomar conference on Signal Systems, and Computers, Nov. 6-9, 2011.

Sharif, et al., "Adaptive Doppler Compensation for Coherent Acoustic Communication," IEE Proc.—Radar, Sonar Navig., vol. 147:5, Oct. 2000.

* cited by examiner

SYSTEM AND METHOD FOR BROADBAND DOPPLER COMPENSATION

CROSS-REFERENCE TO RELATED APPLICATIONS

The present application claims priority under 35 U.S.C. §119(e) to U.S. Provisional Patent Application Ser. No. 61/731,406, filed Nov. 29, 2012, which is incorporated herein by reference in its entirety.

STATEMENT OF GOVERNMENT SUPPORT

The United States government may hold license and/or other rights in this invention as a result of financial support provided by governmental agencies in the development of aspects of the invention. The claimed invention described herein was supported by a grant from the Department of the Navy, Office of Naval Research, under grants ONR MURI N00014-07-1-0738 and ONR N00014-07-1-0311.

BACKGROUND

Unless otherwise indicated herein, the materials described in this section are not prior art to the claims in this application and are not admitted to be prior art by inclusion in this section.

Doppler Effects and other sources of discrepancy between the time-scale of emission and the time-scale of reception play a significant role in many communication and other signal transmission systems. In Broadband communication cases, a received signal is typically distorted because of Doppler effects, which induce a change in the relative time-scale between the signal emission process and the signal reception process. As such, a significant challenge in underwater acoustic (UWA) communications is the proper compensation for time-scale differences between the emission signal at the transmitter and the received signal at the receiver. These time-scale differences occur due to motion of either the source or receiver, changes in the motion or velocity of the medium of propagation, or even due to electronic means, such as asynchrony in the timing references used in the source and receiver.

Further, due to its large delay spread and rapid time variation, a UWA channel is particularly challenging for high-data-rate digital communications. The transmitted signal bandwidth can be also a substantial fraction of its center frequency making the common narrowband assumptions invalid. Broadband transmissions as in UWA communications can experience highly time-varying Doppler. However, conventional approaches to Doppler compensation often assume a constant velocity difference between the source and receiver, or equivalently, a constant time-scale factor between the source and receiver processes. Conventional approaches estimate an average or bulk Doppler factor directly from the received waveform. For compensation, the received baseband signal is then resampled and phase corrected based on this factor and a phase-locked loop is employed to remove any residual Doppler. This approach is prone to instabilities, since an estimation error in the Doppler Effect may be increasingly amplified with time.

Therefore, there is a need for a system and method that address and overcome the above discussed disadvantages and limitations.

SUMMARY

Disclosed herein are an improved method and system for broadband Doppler compensation in underwater acoustic communications.

In one aspect, an embodiment of a Doppler compensation system includes a transmitter unit for transmitting a signal, wherein the transmitted signal being associated with an emission time-scale, a receiving unit for receiving a signal, wherein the received signal is associated with a receive time-scale that is not equivalent to the emission time-scale, and a Doppler compensating unit configured to estimate an inverse temporal distortion function, wherein the Doppler compensating unit implements the inverse temporal distortion function to estimate the transmitted signal.

In another aspect, a Doppler compensation system includes a transmitting unit for transmitting a signal, wherein the transmitted signal being associated with an emission time-scale; a receiving unit for receiving a signal, wherein the received signal is associated with a receive time-scale that is not equivalent to the emission time-scale, and a Doppler compensating unit configured to estimate an inverse temporal distortion function, wherein the inverse temporal distortion function is estimated on a sample-by-sample basis that may be at a faster rate than that of the data symbol rate, and wherein the Doppler compensating unit implements the inverse temporal distortion function to estimate the transmitted signal.

In yet another aspect, an apparatus for Doppler compensation includes a Doppler compensating unit configured to estimate an inverse temporal distortion function, wherein the Doppler compensating unit implements the inverse temporal distortion function to estimate data symbols of a signal transmitted by a transmitting unit, and an equalizer for removing signal dispersion and multipath effects.

In yet another aspect, a Doppler compensation method includes transmitting a signal, wherein the transmitted signal includes a sequence of data symbols transmitted based on an emission time-scale, receiving a signal, wherein the received signal is associated with a receive time-scale that is different from the emission time-scale, and Estimating sample times using a Doppler compensating unit for the received signal so that the received signal and the transmitted signal share the same time scale.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

DETAILED DESCRIPTION

Figure 1:
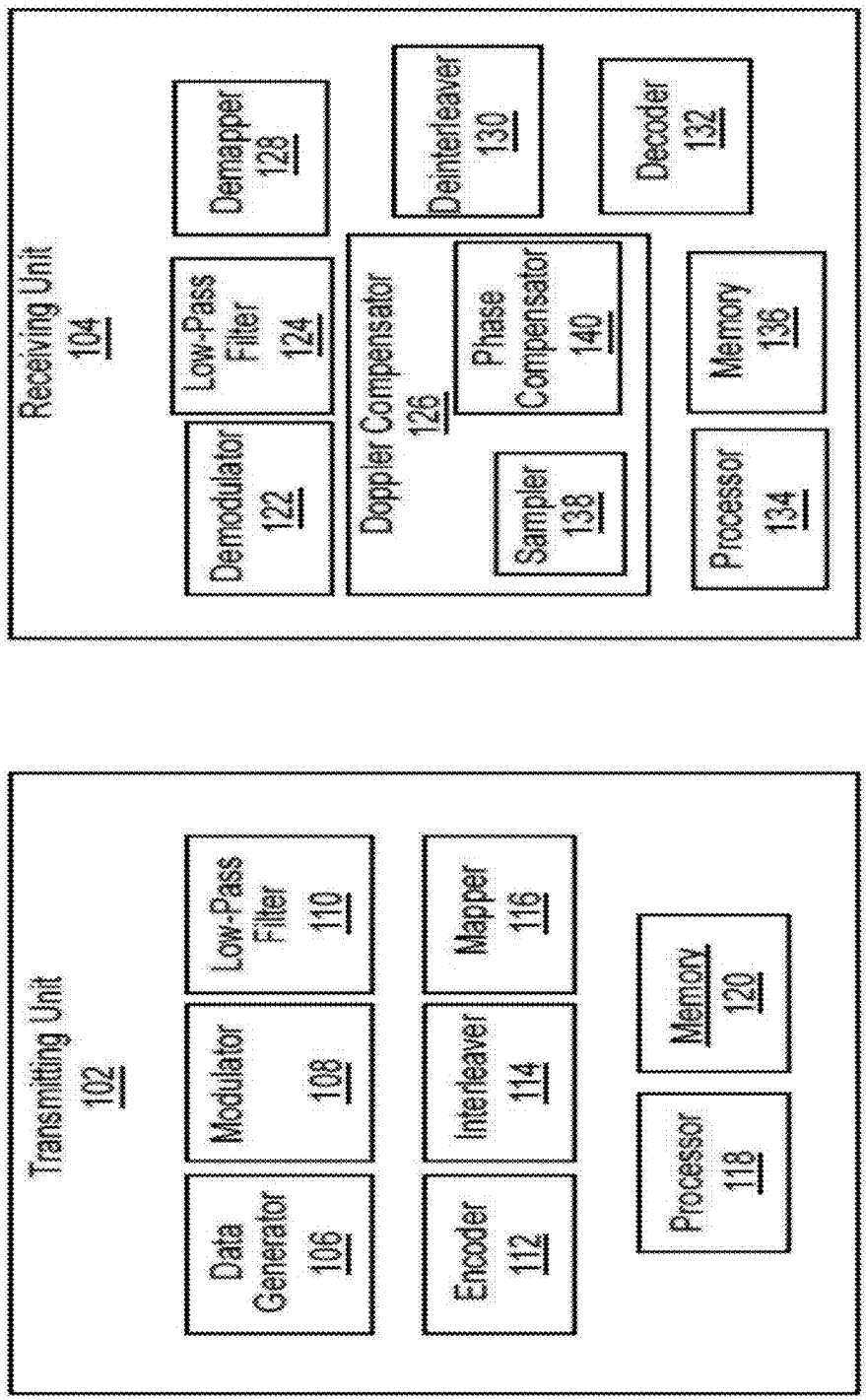
FIG. 1 is a block diagram illustrating components of a transmitting unit and of a receiving unit.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

Wireless communication is an essential component of many underwater operations, such as those involving underwater vehicles. However, the conductivity of salt water prevents electromagnetic waves from penetrating deep into the ocean, thus preventing the use of radio based communication technology in the ocean environment. As a result, engineers have made use of acoustics in an attempt to meet underwater communication needs. There are several acoustic modems on the market that provide a transparent data link and can reach data rates of the order of 10 Kbits/second, but when communication signals have multiple interactions with scatterers, such as the surface or the ocean bottom, harsh multi-path arises. Under these conditions, existing modems perform poorly and only achieve data rates of the order of 100 bits/second. These effects are typically most severe in horizontal, long-range communication.

In addition to multi-path, both the communication platforms and the communications medium itself may have significant motion. Unlike in mobile radio systems, these influences cannot be neglected in the design of acoustic communication systems. "Stationary" acoustic systems may move at speeds of several meters per second due to the forces induced by currents, tides, and waves. Autonomous underwater vehicles (AUVs) move at comparable speeds and submarines can move even faster. This leads to Mach numbers on the order of 1E-3 and higher. In comparison, a velocity of 400 km/h in radio channels translates to a Mach number of only 3.7E-7, i.e., several orders of magnitude smaller. Motion always manifests as time-varying temporal scaling of the received waveform. This temporal distortion is a time-scale distortion, in that the transmitted and received signals are effectively defined over different, possibly time-varying time-scales. In radio channels, this is typically negligible, while in acoustic communications, it can be catastrophic if not compensated dynamically. The research community has explored adapting the most sophisticated techniques known from radio communication such as Space-Time coding, Turbo Equalization, Orthogonal Frequency Division Multiplexing (OFDM), and Low Density Parity Check (LDPC) coding but only data rates in the range of 6 bits/s to 48 Kbit/s have been realized. One fatal flaw of many of these works is that the channel model is borrowed from the radio communication community and only slightly modified, if at all, and hence does not properly respect the physics of the underlying acoustic system. A popular assumption is that the Doppler is constant (i.e., a fixed time-scaling between transmit and receive signals) over the time of a data block and the remaining channel effect is linear and near time-invariant, but in reality the Doppler can be highly time-varying and different wave propagation paths can experience different Doppler (i.e., different time-scale distortions along each path). The UWA channel remains one of the most difficult communication channels and our understanding of it is still in its infancy.

At the receiver in a radio communication link, equalizers are employed in order to remove the inter-symbol interference introduced by channel dispersion and multi-path propagation, but the Doppler Effect cannot be compensated for in this manner. One approach to Doppler Effect compensation is configured to obtain an estimate of the average Doppler Effect factor. For compensation, the received baseband signal is then resampled and phase corrected based on this factor and a phase-locked loop is employed to remove any residual Doppler. This approach, however, only works if the motion induced temporal scaling of the received waveform is quasi-time-invariant. In this document a different approach is introduced in which time-varying Doppler is explicitly modeled, tracked and compensated throughout a block transmission in an underwater acoustic communication system. This method has been field-tested successfully on data from multiple underwater acoustic experiments at sea. Performance examples are shown from the MACE10 experiment. To illustrate the robustness of this approach to high rates of Doppler variation, as well as the ability of this approach to track source-receiver position and velocity, a variety of simulations are also provided.

Accordingly, a novel Doppler Effect compensation method in information bearing signals is provided that recursively tracks an optimal resampling and phase drift correction of a received waveform. Further, the recursive tracking accurately tracks the propagation path distance and propagation path velocity. Moreover, results are provided from extensive performance evaluations of a sample-by-sample, recursive resampling technique, in which time-varying Doppler is explicitly modeled and tracked throughout a block transmission in a UWA communication system. Performance examples are described hereafter in the results of an underwater acoustic communications experiment, referred to as the MACE experiment. To illustrate the robustness of this approach to high rates of Doppler variation, as well as the ability of this approach to track source-receiver and velocity, a variety of simulations are also provided.

Referring to FIG. 1, an AUW communications system 100 includes an acoustic transmitter (transmitting unit) 102 configured to transmit an acoustic signal, and an acoustic receiver (receiving unit) 104. The position of transmitter 102 relative to receiver 104 can vary with time thereby defining a relative motion which can also vary with time. In accordance with one embodiment, transmitter 102 includes a data generator 106, a modulator 108, a low-pass filter 110, an encoder 112, an interleaver 114, a mapper 116, a processing unit (processor) 118, and a memory unit 120. Receiver 104 includes a demodulator 122, a low-pass filter 124, a Doppler compensator 126, a demapper 128, a deinterleaver 130, a decoder 132, a processing unit (processor) 134, and a memory unit 136. Doppler compensator 126 is configured to include a sampler 138 and a phase compensator 140.

In one exemplary embodiment, transmitter 102 is configured to send a sequence "s" of symbols "$s_n$" from a finite set of signal constellation points $A \subset C$ over a frequency selective channel that also experiences a time-varying Doppler Effect. The sequence s is mapped to a waveform s(t): R→C $$s(t)=\Sigma_l s_l p(t-lT) \quad \text{Equation 1}$$

by use of a basic pulse function p(t) time shifted by multiples of a symbol period T. This signal is then modulated to a passband at carrier frequency $f_c$ and transmitted over the channel to yield:

$$s_{PB}(t)=2\Re\{s(t)e^{2\pi i f_c t}\} \quad \text{Equation 2}$$

The time-dispersive effects of the channel are assumed to be linear and quasi-stationary and can hence be modeled by a linear time invariant system with some kernel function $h_{PB}(t)$ as follows:

$$\bar{r}(t)=s_{PB}(t)*h_{PB}(t) \quad \text{Equation 3}$$

If one of transmitter 102 and receiver 104 is in motion or both of them are in motion, receiver 104 can observe a time warped version of $\bar{r}(t)$ in additive noise. In order to define this effect more rigorously, a position vector $x_{tx}(t)$ of transmitter 102 and a position vector $x_{rx}(t)$ of receiver 104 are introduced. Since signal $s_{PB}(t)$ needs to travel some distance to reach receiver 104, there will typically be a (time-varying) delay in the received signal $\bar{r}(t)$ relative to transmitted signal $s_{PB}(t)$. In particular, a pulse observed by receiver 104 at time t has actually been emitted by transmitter 102 at some earlier time τ(t) that is a solution to the following implicit equation:

$$(t-\tau(t))c=\|x_t(\tau(t))-x_r(t)\|_2 \quad \text{Equation 4}$$

where c is a wave speed. Note that under a realistic assumption, because both transmitter 102 and receiver 104 move at a speed less than c, τ(t) is a strictly increasing continuous function and is referred to as a temporal distortion function. The signal $r_{PB}(t)$ that is observed at receiver 104 can be represented as follows:

$$r_{PB}(t)=\bar{r}(\tau(t))+v_{PB}(t) \quad \text{Equation 5}$$

where the process $v_{PB}(t)$ is an additive white Gaussian noise. Equation 5 illustrates that the signal observed at receiver 104 has a different time-scale that signal emitted by transmitter 102, and one can convert time values from one scale to time values on the other scale using a temporal distortion function τ(t). For the application of underwater acoustic communications, a scale distortion between transmitted and received waveforms is indeed a time-scale distortion, and is typically caused by motion of the source and receiver as well as motion of the propagation medium or scatterers in the path of propagation. Potential other sources of scale distortion between signals at the transmitter and receiver include spatial differences, as in data storage or other spatially distributed data. For example, in a magnetic storage application transmitter 102 writes data symbols onto a medium that is later read by receiver 104. If the velocity of the read equipment over the recording medium used to recover the signal from the medium is different from the velocity over the medium when it was written to the medium, as might occur due to disk drive or tape processing equipment differences, then the signals as read from the storage medium (receive signal) will exhibit similar time-scale distortion as caused by the Doppler effects described above. Similar distortion could arise from spatial aberrations in the medium, such as stretching or contraction of the medium from heat, stress, or other external influences.

In one embodiment, a time-varying Doppler Effect is expressed as follows:

$$d(t)=1-\tau'(t) \quad \text{Equation 6}$$

When the relative motion between transmitter 102 and receiver 104 along the line of signal propagation has constant velocity, d(t)=d and the Doppler effect simply scales the time-axis of the signal $\bar{r}(t)$ by 1−d.

Further, a convolution of p(t) with h(t), which represents an equivalent base-band channel impulse response, yields:

$$\tilde{h}(t)=h(t)*p(t) \quad \text{Equation 7}$$

Also a convolution of h(t) with s(t) yields:

$$\tilde{r}(t)=h(t)*s(t)=\Sigma_l s_l \tilde{h}(t-lT) \quad \text{Equation 8}$$

The received signal $r_{PB}(t)$ is then expressed as follows:

$$r_{PB}(t)=2\Re\{\tilde{r}(\tau(t))e^{2\pi i f_c \tau(t)}\}+v_{PB}(t) \quad \text{Equation 9}$$

Once captured by receiver 104, the signal $r_{PB}(t)$ is demodulated by $f_c$ and low-pass filtered to yield:

$$r(t)=e^{i2\pi f_c(\tau(t)-t)}\tilde{r}(\tau(t))+v(t) \quad \text{Equation 10}$$

where v(t) denotes the demodulated and filtered noise process.

Doppler Compensation

In one embodiment, a novel approach to temporal distortion compensation estimates the inverse temporal distortion function $\tau^{-1}(t)$ at t=0, T, 2T, . . . and then resamples the received signal at those time values in order to remove any temporal distortion from it. A particular temporal distortion compensation case involves no multi-path effects and no signal attenuation. Equation (10) then reads:

$$r(t)=e^{i2\pi f_c(\tau(t)-t)}s(\tau(t))+v(t) \quad \text{Equation 11}$$

Moreover, if a value of $\tau^{-1}(nT)$ was known, then the sequence $s_n$ could be recovered in additive noise. In practice, a precise value of $\tau^{-1}(nT)$ is unknown, but its approximation $\tau_{n/n-1}^{-1}$ can be obtained. A synchronization between transmitter 102 and receiver 104 can readily yield a value of $\tau_{n/n-1}^{-1}$ for n=0. In One embodiment, a recursive algorithm is structured to obtain $\tau_{n+1/n}^{-1}$ from $\tau_{n/n-1}^{-1}$ for any n. In accordance with this recursive algorithm, a state $\tau_{n+1/n}^{-1}$ is introduced and represents a time derivative of $\tau^{-1}(t)$ at t=nT, and its estimate is denoted as $\dot{\tau}_{n+1/n}^{-1}$.

In one exemplary embodiment, the above-introduced algorithm is configured to evaluate r(t) at $\tau_{n/n-1}^{-1}$ as follows:

$$r(\tau_{n/n-}^{-})=e^{i2\pi f_c(nT+\epsilon_n r/n-1^{-1})}s(nT+\epsilon_n)+v(\tau_{n/n-}^{-1}) \quad \text{Equation 12}$$

where the error $\epsilon_n=\tau(\tau n/n-1^{-1})-nT$. The signal r(t) is available at the receiver in some form. For band limited r(t) this may include equally spaced samples of r(t) at a period of Ts seconds, i.e. r[k]=r(kTs), where, typically, Ts≤T/2. The signal may also be available in other forms. In either case, since the desired sample of r(t) is typically not one of the samples available in r[k], then computing $r(\tau_{n/n-1}^{-1})$ can be accomplished either through resampling the stored signal or computing this value as a function of the samples available in r[k], through interpolation, estimation, or other signal processing methods.

Further, in this exemplary embodiment, the recursive algorithm is configured to obtain an estimate $\hat{s}_n$ of $s_n$ by removing the phase drift $2\pi f_c(nT-\tau_{n/n-1}^{-1})$ from $r(\tau_{n/n-1}^{-1})$:

$$\hat{s}_n=r(\tau_{n/n-1}^{-1})e^{i2\pi f_c(nT-\tau_{n/n-1}^{-1})} \quad \text{Equation 13}$$

$$\hat{s}_n=e^{i2\pi f_c \epsilon_n}s(nT+\epsilon_n)+v(\tau_{n/n-1}^{-1})e^{-i2\pi f_c(nT-\tau_{n/n-1}^{-1})} \quad \text{Equation 14}$$

Based on Equations 12 and 13, one can note that the smaller the magnitude of the error $\epsilon_n$ and the additive noise are, the better is the estimate $\hat{s}_n$. The error $\epsilon_n$ is typically small enough to lead to the following expression of the sequence $s_n$:

$$s(nT+\epsilon_n)\approx s_n \quad \text{Equation 15}$$

However, in a phase term the error $\epsilon_n$ is amplified by $2\pi f_C$. Further, in one embodiment, an argument, which can be expressed as shown in Equation 16, can be used as a measurement of error $\epsilon_n$:

$$\Omega_n = \arg(\hat{s}_n s_n^*) \approx 2\pi f_C \epsilon_n \qquad \text{Equation 16}$$

Moreover, the recursive algorithm is configured to compute the approximation $\tau_{n+1/n}^{-1}$ from $\tau_{n/n-1}^{-1}$ based on the measurement $\Omega_n$ as follows:

$$\tau_{n+1/n}^{-1} = \tau_{n/n-1}^{-1} - \mu \Omega_n \qquad \text{Equation 17}$$

$$\tau_{n+1/n}^{-1} = \tau_{n/n-1}^{-1} + \tau_{n+1/n}^{-1} T \qquad \text{Equation 18}$$

where $\mu$ is a step size of the recursive algorithm.

Figure 5:
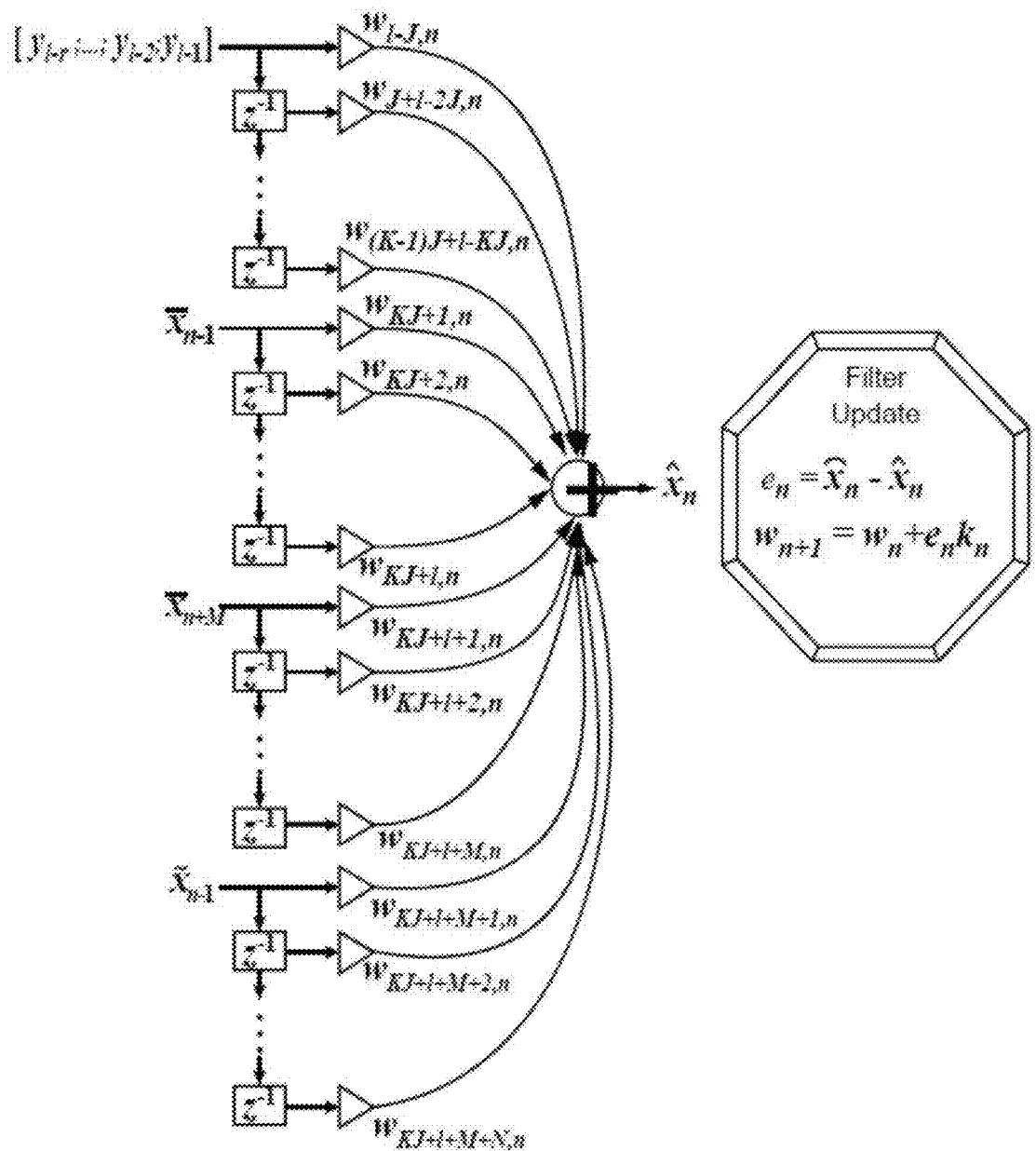
FIG. 5 is a block diagram illustrating an exemplary embodiment of an SISO equalizer.

In UWA communication scenarios, the transmitted signal may also be subject to dispersion and multi-path effects. In this case, a computation in Equation 14 can be used to obtain an estimate of $\tilde{r}(nT)$, which is then processed by an equalizing unit to obtain $\hat{s}_n$. This estimate of $\bar{r}(nT)$ can then be processed by an equalizer to obtain $\hat{s}_n$. In one embodiment, the equalizer can be as shown in FIG. 5, where the Doppler compensator is coupled to a linear or decision feedback equalizer for the channel. In this embodiment, the transmitted data symbols are estimated as a linear function of these Doppler compensated signal values using one of a number of channel equalization methods. One embodiment includes a minimum mean-square error channel equalizer, where the channel weights, $w_{j,n}$ in FIG. 5, are updated using a recursive algorithm, such as the RLS, Kalman, or LMS algorithm, using knowledge of the transmitted symbol alphabet and the output of the channel equalizer. If the data symbols have been protected by an error-correction code, then the channel equalizer can also be coupled to a decoder for the error correction code. An output of the decoder can also be used in the equalizer either as inputs or as part of the update of the weights of the equalizer. This is commonly done in Turbo Equalization.

Note that the range between transmitter 102 and receiver 104 at time $\tau^{-1}(nT)$ can be estimated from the value of the approximation $\tau_{n/n-1}^{-1}$ using Equation 4:

$$\|x_t(\tau(\tau^{-1}(nT))) - x_r(\tau^{-1}(nT))\|_2 = c(-nT + \tau^{-1}(nT)) \qquad \text{Equation 19}$$

$$\approx c(-nT + \tau_{n|n-1}^{-1}) \qquad \text{Equation 20}$$

When several hydrophone elements are used at receiver 104, such a range estimate can be computed for each one and multilateration can be used to determine the relative position of transmitter 102.

Figure 2:
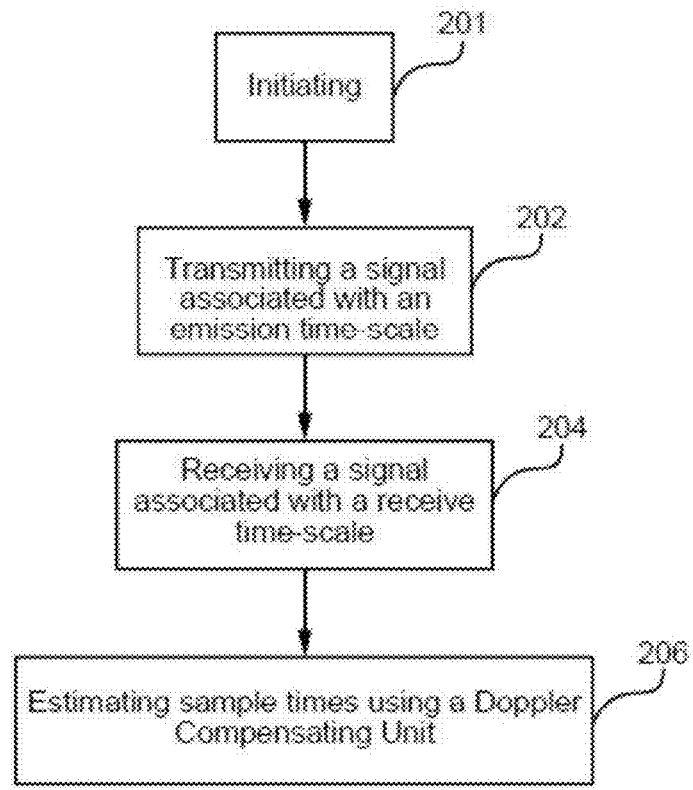
FIG. 2 is a flow chart illustrating an exemplary embodiment of a method for broadband Doppler compensation in an underwater acoustic communication.
Figure 3:
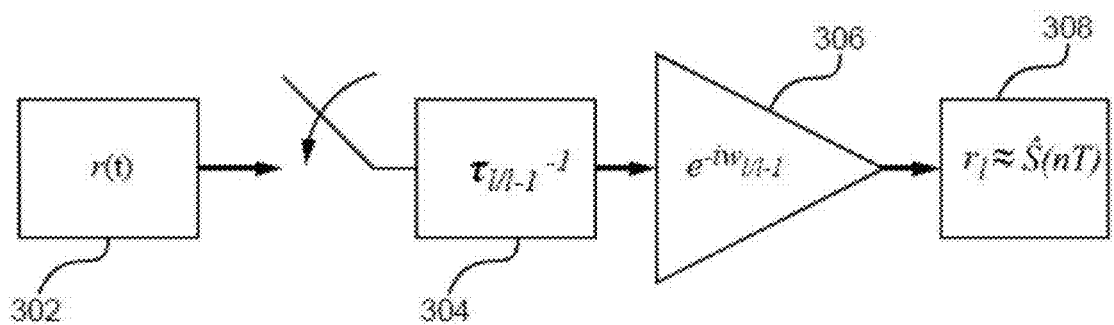
FIG. 3 is a block diagram illustrating an exemplary embodiment of a broadband Doppler compensator.

Now referring to FIG. 2, a flow diagram shows an exemplary method 200, initiated at Step 201, for broadband Doppler compensation in underwater acoustic communications. At step 202, transmitter 102 is configured to transmit a signal that includes a sequence of data symbols transmitted based on an emission time-scale. At Step 204, receiver 104 is configured to receive a signal associated with receive time-scale that is different from the emission time-scale. Subsequently, a Doppler compensating unit is configured to estimate sample times for the received signal so that the transmitted signal and the received signal share the same time scale, at Step 206.

Figure 4:
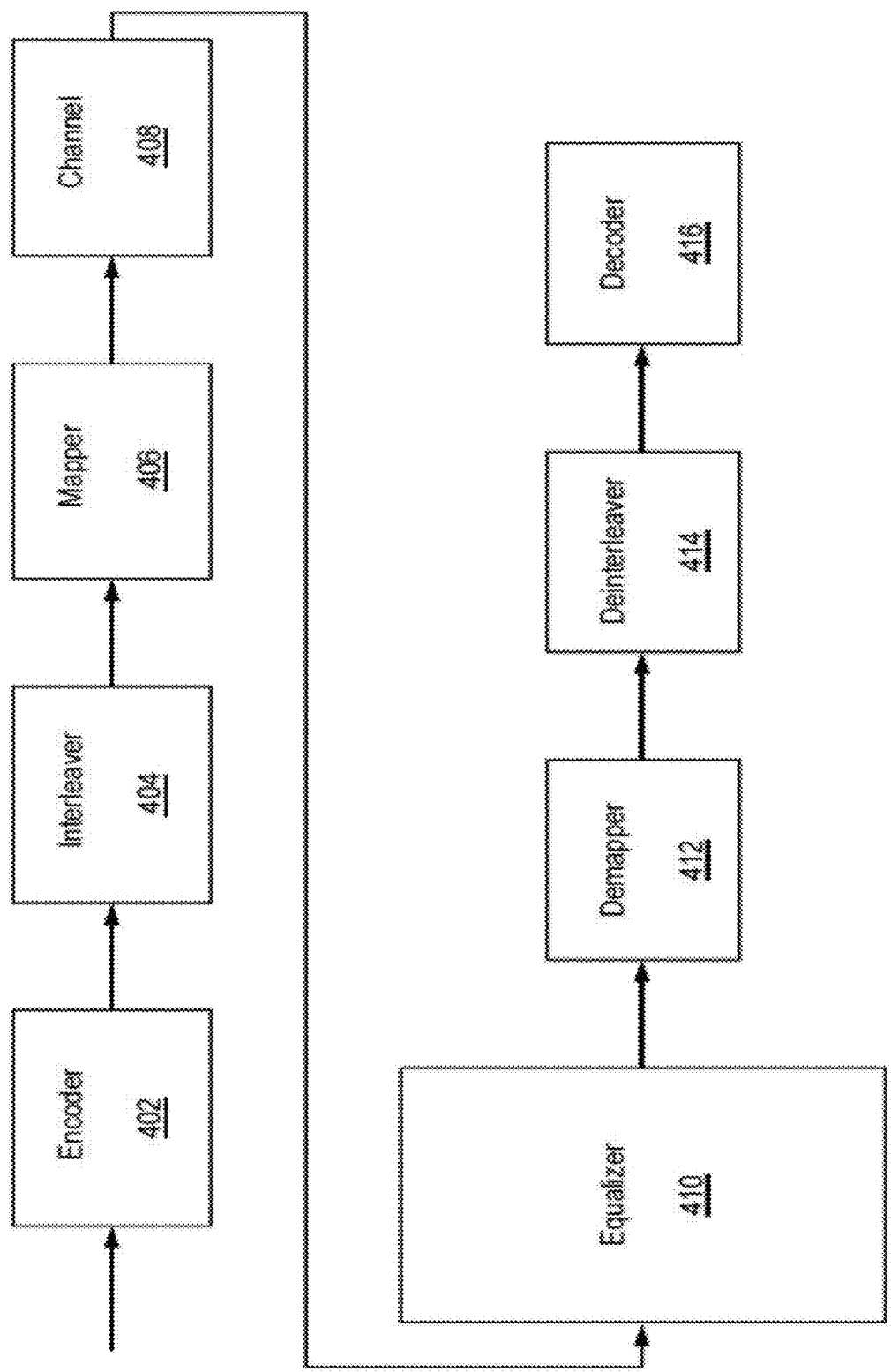
FIG. 4 is a block diagram illustrating an exemplary embodiment of an acoustic system that includes an equalizer.

Now referring to FIG. 4, an exemplary embodiment of a communication system 400 illustrates a process of estimating a set of symbols that were subject to an underwater acoustic transmission. As shown, an encoder 402 is configured to encode a set of data "a" into a set of data "d" that is transformed a set of data "e" by an interleaver 404. The set of data "e" is then mapped by a mapper 406 into a quadrature phase-shift keying (QPSK) arrangement, which may include one bit per symbol or two bits per symbol for example, to generate a sequence $\underline{S}$ that is transmitted by transmitter 102 through a communication channel 408 on a signal carrier having a frequency fc. The transmitted sequence $\underline{S}$, which may be subject to Doppler Effects and noise during the transmission, is received as a signal r(t) by receiver 104. In order to derive an estimate of the transmitted sequence $\underline{S}$, the received signal r(t) is processed by an equalizer 410, which may include a demodulator, a low-pass filter, a non-uniform sampler, and a phase compensator, as discussed above. In another exemplary embodiment, equalizer 410 may be a Soft-In-Soft-Out (SISO) equalizer, as shown in FIG. 5. The estimated sequence $\hat{S}$ is then de-mapped using a demapper 412, de-interleaved using a deinterleaver 414, and then decoded using a decoder 416 to generate sequence â. When equalizer 410 is a SISO linear equalizer, sequence â is provided back to equalizer 410, as shown in FIG. 4, to further minimize an error in the estimation process of the transmitted sequence $\underline{S}$.

Figure 6:
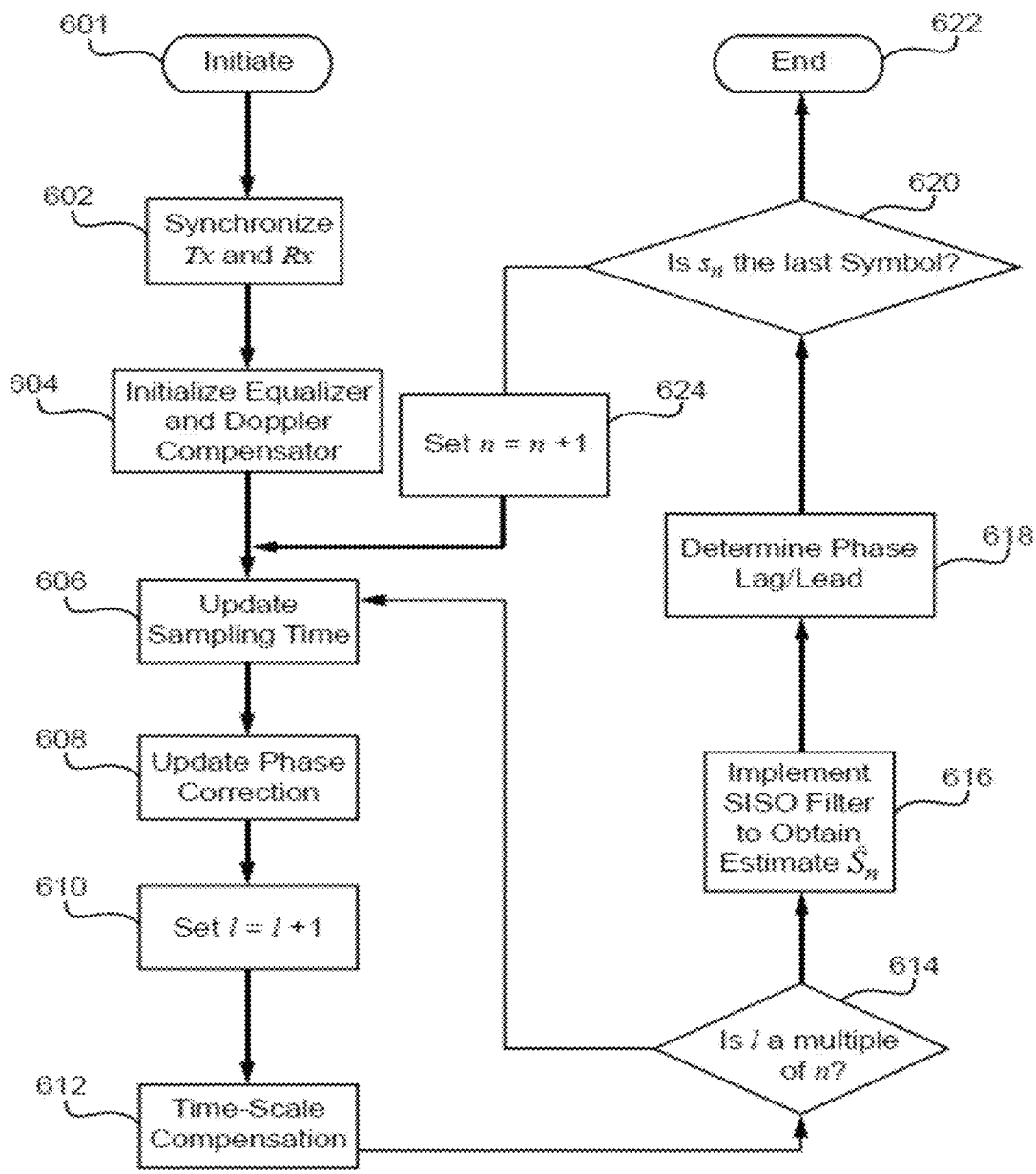
FIG. 6 is a flow chart illustrating an exemplary embodiment of a method for broadband Doppler compensation in an underwater acoustic communication that utilizes a SISO equalizer.

Now referring to FIG. 6, a flow chart 600 shows an exemplary method 602 for an UWA temporal distortion compensation using a SISO equalizer. Following the initiation of the method 602 at Step 601, receiver 104 is configured to synchronize positions Tx and Rx of transmitter 102 and receiver 104, respectively, at Step 602. At Step 604, equalizer 310 and temporal distortion compensator 126 are initialized, and a non-uniform sampling time defined by recursive evaluation of the inverse retarded time function is updated, at Step 606, as follows: $\tau_{l+1/l}^{-1} = \tau_{l/l-1}^{-1} + \beta_{n/n-1} T_s$. Then, at Step 608, the phase correction, determined as discussed above, is updated as follows: $\omega_{l+1/l} = \omega_{l+1/l} + 2\pi f_C T (1-\beta_{n/n-1})$. Subsequently, at Step 610, a temporal distortion compensation is implemented as follows: $r_l = e^{-i\omega_{l/l-1}} r(\tau_{l/l-1}^{-1})$. Then at Step 612, receiver 104 is configured to determine whether l is a multiple of n. In the affirmative, a SISO filter is used to generate an estimate $\hat{s}_n$, at Step 614. Otherwise, the process goes back to Step 606 to update the non-uniform sampling time. Following the generation of estimate $\hat{s}_n$, receiver 104 is configured to determine a phase lag or lead using the above-derived phase measurement $\Omega_n = \arg(\hat{s}_n s_n^*)$, at Step 616. Based on the determination of the phase lag lead, receiver 104 is configured to update a jump between successive estimated symbols of the transmitted sequence, at Step 618, as follows: $\beta_{n+1/n} = \beta_{n/n-1} - \mu \Omega_n$. Then, at Step 620, receiver 104 is configured to determine whether the estimated symbol $s_n$ is the last symbol. In the affirmative, this symbol estimation process is terminated, at Step 622. Otherwise, index n is augmented by one digit, at Step 624, and the process is repeated for this new index n+1.

Experimental Results

Figure 7:
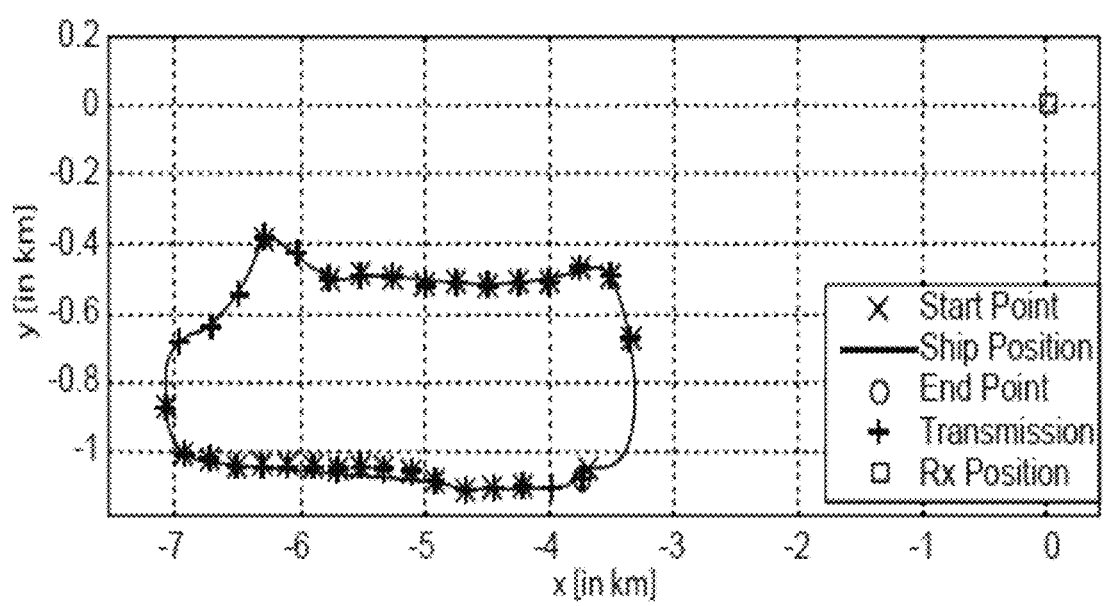
FIGS. 7-12 are graphs that illustrates experimental set-up and results of a broadband Doppler compensation approach.

A performance of one embodiment of the provided temporal distortion compensating compensator is evaluated using real and synthetic data sets. The real data set stems from a Mobile Acoustic Communications Experiment (MACE) conducted at a location (site) having a depth of about 100 m. As shown in FIG. 7, a mobile V-fin with an array of transducers attached was towed along a "race track" course approximately 3.8 km long and 600 m wide. A maximum tow speed was 3 kt. (1.5 m/s) and a tow depth varied between 30 and 60 m. A receiver 12 channel hydrophone array was moored at a depth of 50 m. A range between the transmitter and the receiver array was between 2.7 and 7.2 km.

For a Single Input Multiple Output (SIMO) transmission with one transducer and 12 hydrophones, a rate ½, (131, 171) RSC code and puncturing was used to obtain an effective rate of ⅔. Blocks of 19800 bits were generated, interleaved, and mapped to 16-QAM symbols. A carrier frequency was about 13 kHz. The receiver sampling rate was 39.0625 k samples/second. Data was transmitted at a symbol rate of 19.5313 k symbols/second. A 10% overhead for training symbols for the equalizer achieved a data rate of 23.438 Kbit/s. A square-root raised cosine filter with a roll-off factor 0.2 was used in both the transmitter and the receiver.

Figure 8:
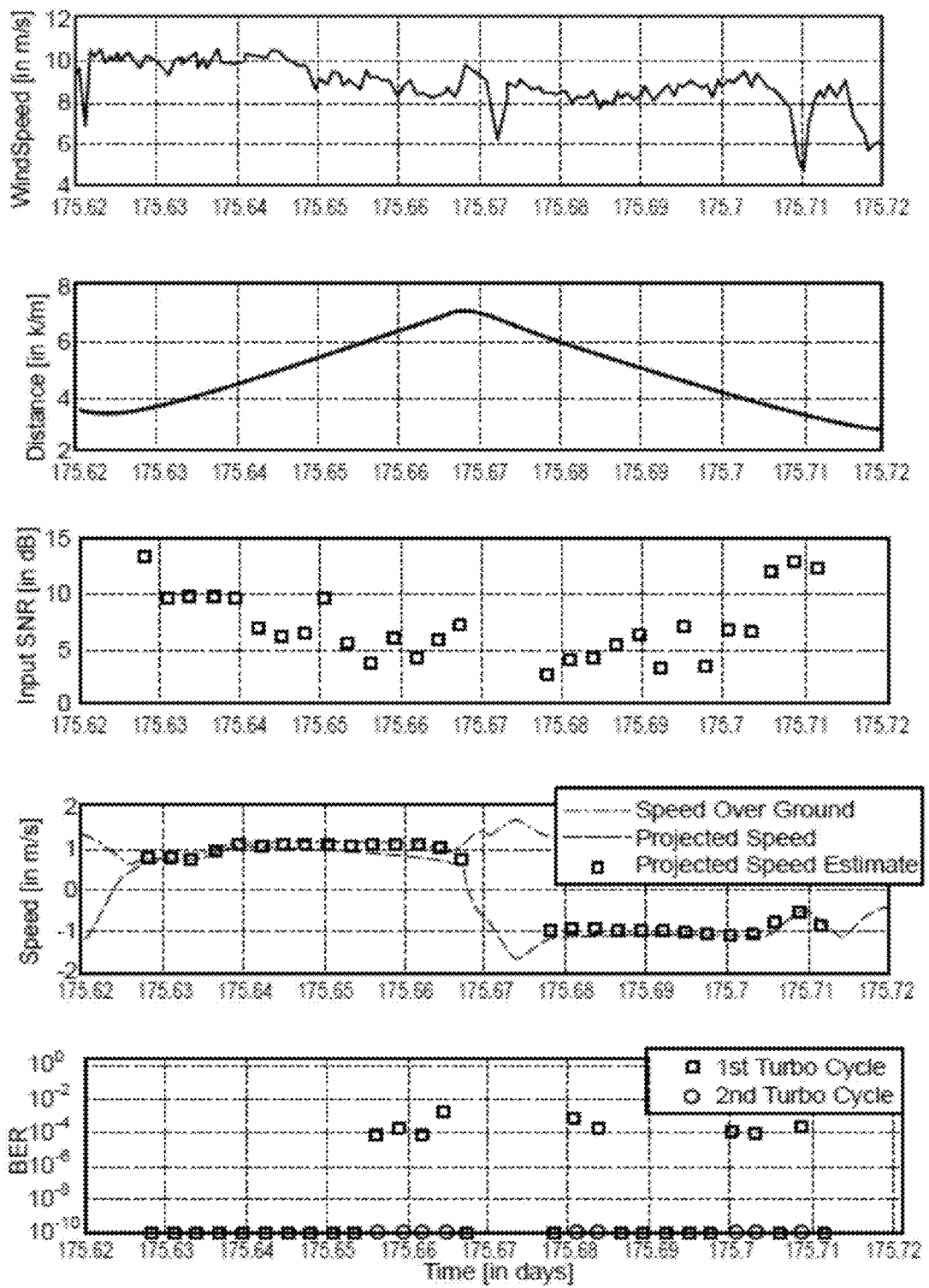
Figure 9:
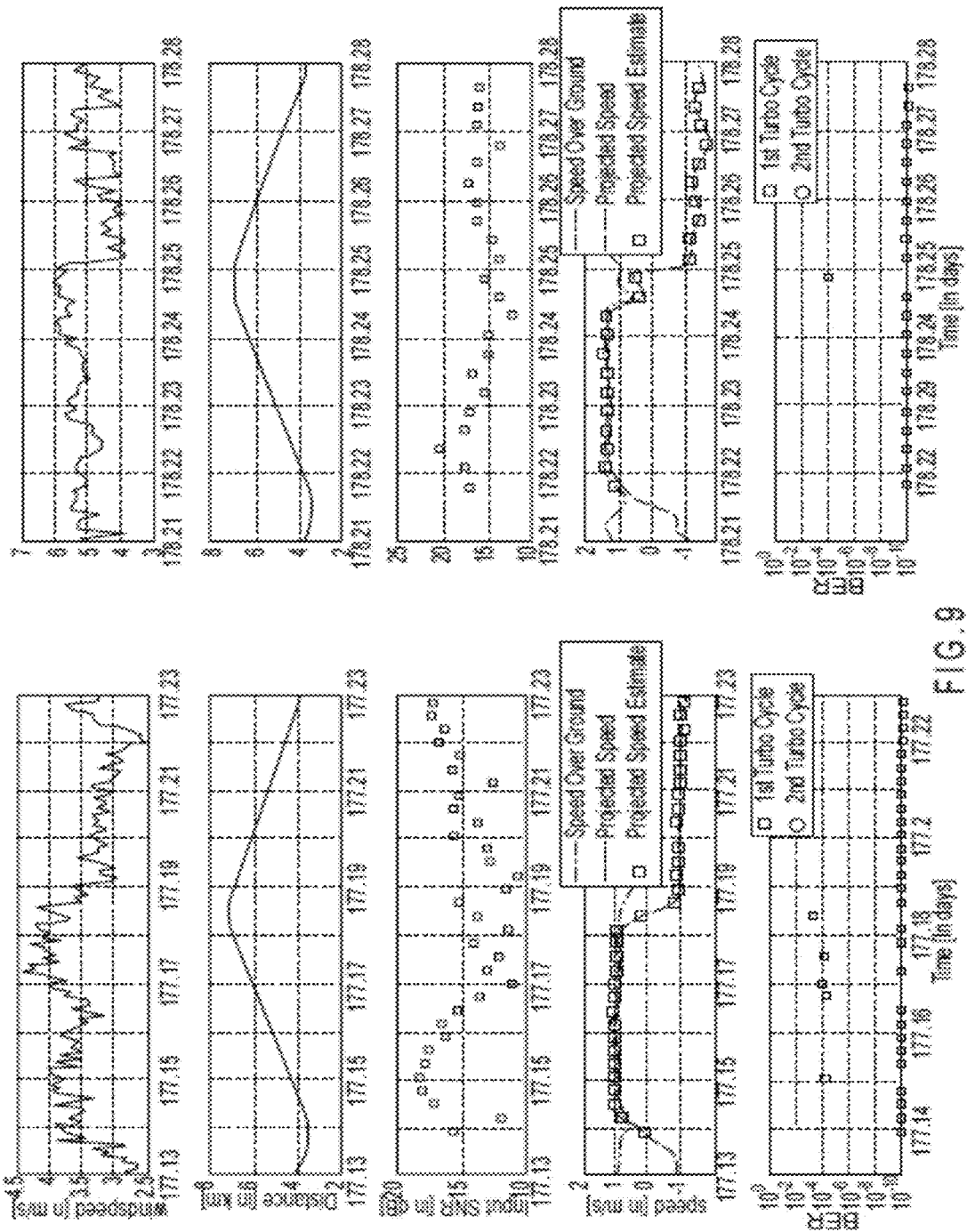
Figure 10:
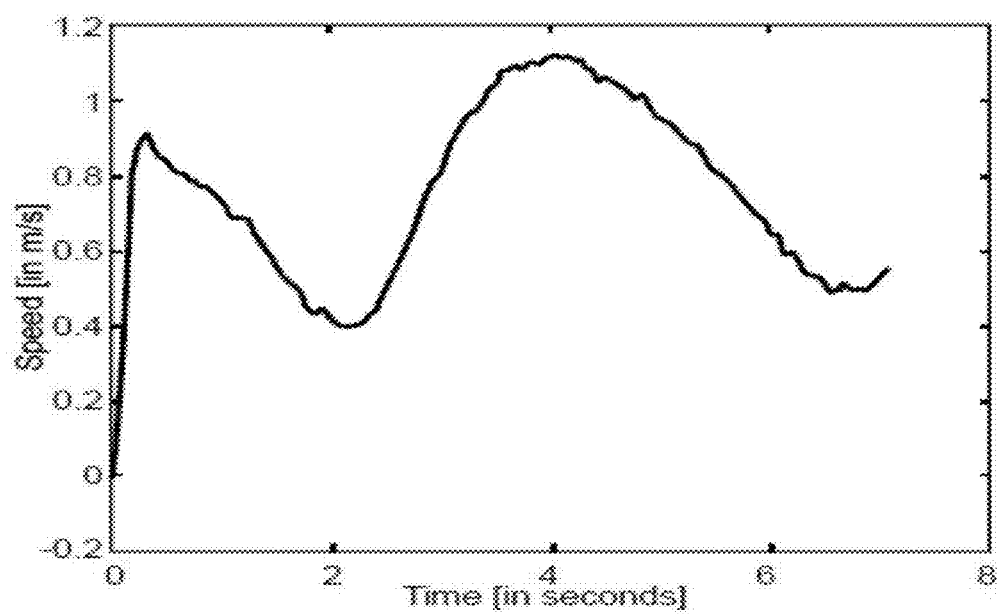
Figure 11:
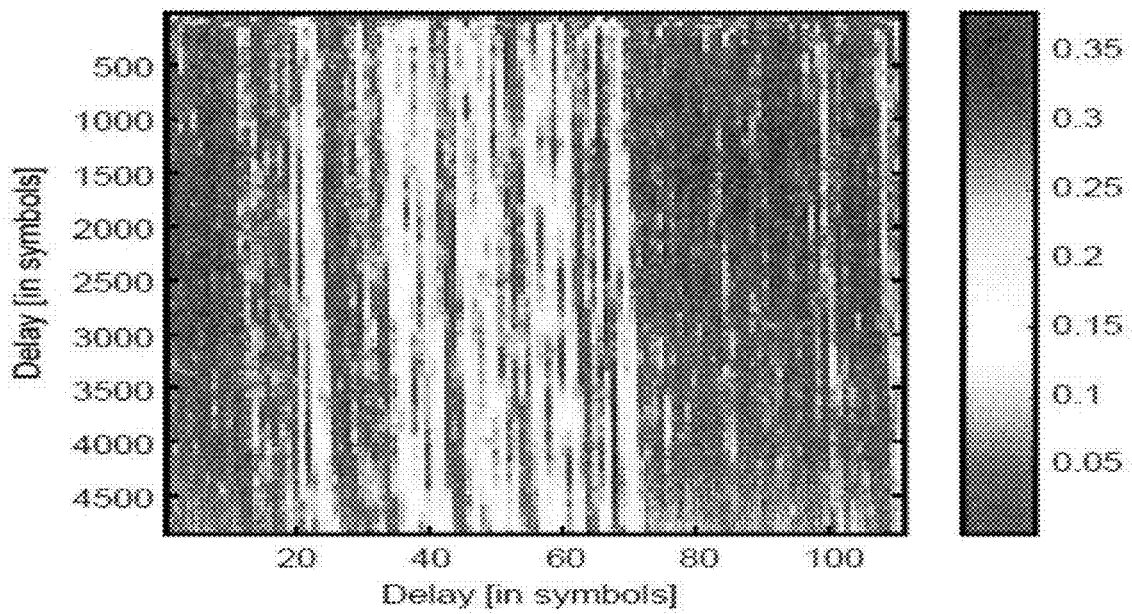

At receiver 104, an LMS direct-adaptive turbo equalizer with the temporal distortion compensator iteratively decoded the received data sequence. A prior work demonstrated that LMS direct-adaptive turbo equalization can dramatically outperform the conventional decision-feedback equalizer. FIGS. 8 and 9 summarize a Bit Error Rate (BER) performance of the receiver on the MACE data set. For all transmissions, the receiver converged to the right code word in two or less iterations. FIG. 10 shows a relative speed between transmitter and receiver as estimated by the proposed temporal distortion compensator during three example transmissions. The following relationship between relative speed $v(t)$ and the derivative $\tau^{-1}(nT)$ was used to generate the FIG. 10 plot:

$$(\tau^{-1}(nT))^{-1} = \tau(\tau^{-1}(nT)) = 1 - v(\tau^{-1}(nT))/c \qquad \text{Equation 21}$$

After synchronization, $v(\tau^{-1}(nT))$ is initialized with 0. According to the Equation 21 formula this corresponds to an initialization of $\tau^{-1}(nT)$ with 1. It should be noted that an insertion of two chirps at the beginning of the data transmission and the measurement of their time dilation can be used to find a much better initial value. Due to the shallow water at the experiment site, the channel exhibited severe multi-path as illustrated in FIG. 5.

Simulation Results

To simulate the effects of motion of transmitter 102 and receiver 104 in the underwater channel, one may suppose that, for any time t, the transmitter position $x_{tx}(t)$ and the receiver position $x_{rx}(t)$, and the signal $\bar{r}(t)$ are provided, in order to evaluate the received signal $r_{PB}(t)$. One goal is then to determine the function $\tau(t)$ for each t corresponding with the ADC samples in receiver 104. To this end, one can note that Equation 4, discussed above, determines an amount of time the transmitted signal travels times the speed of sound equals the distance traveled. Alternatively, Equation 4 can be rewritten as follows:

$$\|x_t(\tau(t)) - x_r(t)\|_c + c\tau(t) - ct = 0 \qquad \text{Equation 22}$$

In order to solve for $\tau(t)$, the following function is established:

$$F_t(\tau) = \|x_t - x_r(t)\|_2 + c\tau(t) - ct = 0 \qquad \text{Equation 23}$$

Hence, for each t, $\tau$ is determined such that $F_t(\tau) = 0$. To guarantee that a unique solution to Equation 23 exists, reasonable conditions are needed such that $F_t(\tau)$ is a strictly increasing and continuous function of $\tau$ for any given t. There are a number of conditions that can be applied to accomplish this. For example, one may specify that $x_t(\tau)$ is Lipschitz continuous for Lipschitz constant $K < c$, or more simply that $\|d(x_t(\tau)/d\tau\|_2 \leq K < c$. It is then a simple matter to compute $\tau(t)$ as the unique root of the continuous and strictly increasing function $F_t(\tau)$.

Figure 12:
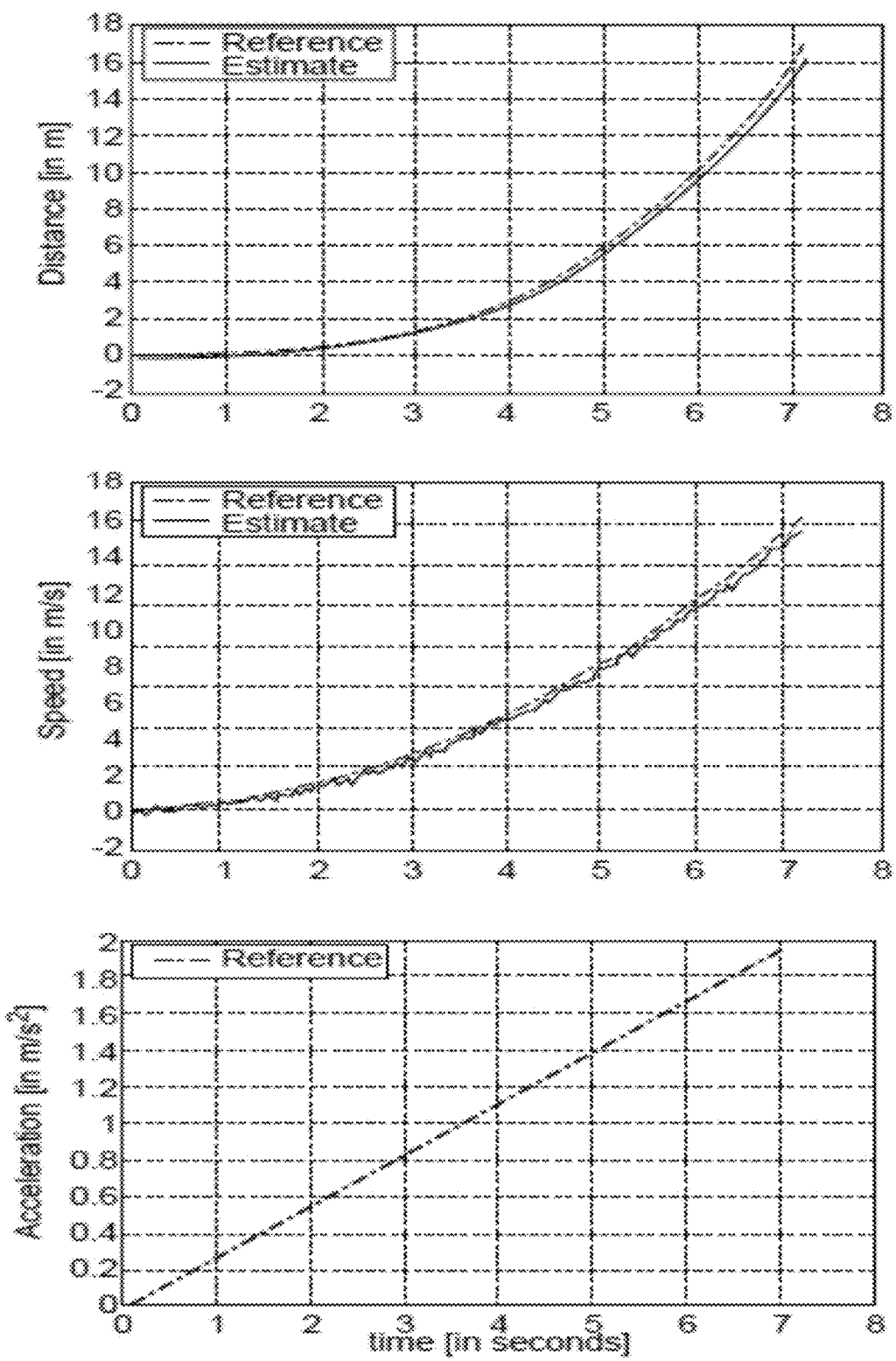

Intuitively, one can expect the estimation error of our temporal distortion compensator to increase as the relative acceleration between transmitter 102 and receiver 104 increases. In order to evaluate the performance of an embodiment of the proposed temporal distortion compensator for different levels of acceleration, a line of sight channel is assumed and the simulator discussed above is used to compute $r_{PB}(t)$ for a relative acceleration that linearly increases from 0 m/s² to 2 m/s². As shown, FIG. 12 compares the estimates of temporal distortion compensator with actual motion values when white Gaussian noise is added at an SNR of 0 dB. Again, only 10% of the transmitted data was used for training.

Each of processing units 118 and 134 can be implemented on a single-chip, multiple chips or multiple electrical components. For example, various architectures can be used including dedicated or embedded processor or microprocessor (μP), single purpose processor, controller or a microcontroller (μC), digital signal processor (DSP), or any combination thereof. In most cases, each of processing units 118 and 134 together with an operating system operates to execute computer code and produce and use data. Each of memory units 120 and 136 may be of any type of memory now known or later developed including but not limited to volatile memory (such as RAM), non-volatile memory (such as ROM, flash memory, etc.) or any combination thereof, which may store software that can be accessed and executed by processing units 118 and 134, respectively, for example.

Figure 13:
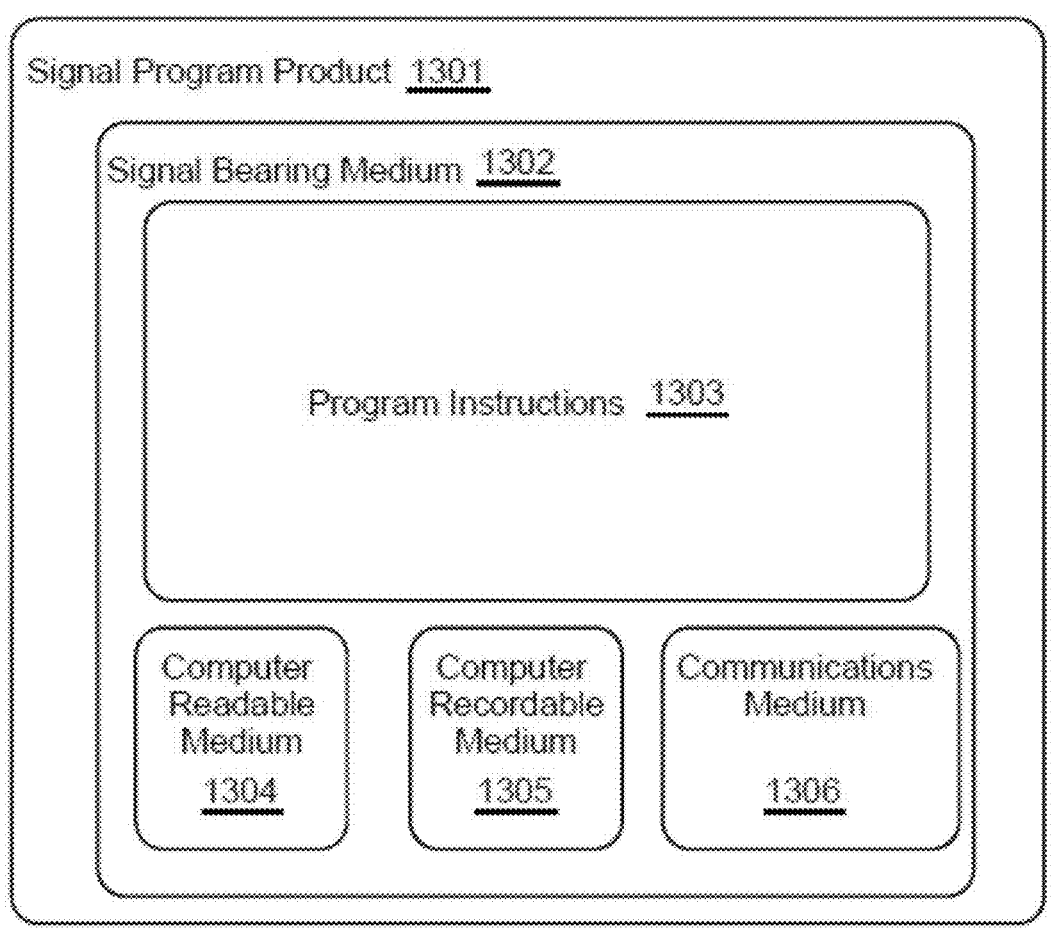
FIG. 13 is a schematic diagram illustrating a conceptual partial view of an example computer program product.

In some embodiments, the disclosed method may be implemented as computer program instructions encoded on a computer-readable storage media in a machine-readable format. FIG. 13 is a schematic illustrating a conceptual partial view of an example computer program product 1300 that includes a computer program for executing a computer process on a computing device, arranged according to at least some embodiments presented herein. In one embodiment, the example computer program product 1300 is provided using a signal bearing medium 1301. The signal bearing medium 1301 may include one or more programming instructions 1302 that, when executed by a processing unit may provide functionality or portions of the functionality described above with respect to FIGS. 2 and 6. Thus, for example, referring to the embodiment shown in FIGS. 2 and 6, one or more features of blocks 202-214, and blocks 602-624 may be undertaken by one or more instructions associated with the signal bearing medium 1301.

In some examples, signal bearing medium 1301 may encompass a non-transitory computer-readable medium 1303, such as, but not limited to, a hard disk drive, memory, etc. In some implementations, the signal bearing medium 1301 may encompass a computer recordable medium 1304, such as, but not limited to, memory, read/write (R/W) CDs, R/W DVDs, etc. In some implementations, signal bearing medium 1301 may encompass a communications medium 1305, such as, but not limited to, a digital and/or an analog communication medium (e.g., a fiber optic cable, a waveguide, a wired communications link, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A Doppler compensation system, comprising:
a transmitter unit for transmitting a signal, wherein the transmitted signal being associated with an emission time-scale;
a receiving unit for receiving a signal, wherein the received signal is associated with a receive time-scale that is not equivalent to the emission time-scale; and
a Doppler compensating unit configured to estimate an inverse temporal distortion function, wherein the inverse temporal distortion function is continuously estimated as a function of time on a recursive, sample-by-sample basis and is used to estimate the transmitted signal, wherein the inverse temporal distortion function utilizes an adjusted sampling rate.

2. The system of claim 1, wherein the Doppler compensation unit uses the inverse temporal distortion function to re-sample the received signal according to the emission time-scale, using a sample-by-sample resampling technique.

3. The system of claim 2, wherein the Doppler compensating unit estimates a relative position of either the transmitting unit, or the receiving unit, or both the transmitting and receiving units.

4. The system of claim 2, wherein the receiving unit comprises a multichannel receiver that receives a plurality of signals, the Doppler compensating unit comprises a plurality of units, and wherein a unit of the plurality of units is applied to a respective signal of the plurality of received signals of the multichannel receiver.

5. The system of claim 1, wherein the transmitted signal is modulated at a predetermined carrier frequency, and wherein the adjusted sampling rate is adjusted according to an error measurement associated with a previously received sample.

6. The system of claim 5, wherein the receiving unit demodulates the received signal before the Doppler compensation unit.

7. The system of claim 1, wherein the transmitted signal comprises a sequence of data symbols, wherein the Doppler compensating unit computes a rate adjustment for the adjusted sampling rate based on an analysis of a previously received sample.

8. The system of claim 7, wherein the data symbols are estimated based on outputs of the Doppler compensation unit.

9. The system of claim 8, wherein the data symbols estimated are phase-adjusted according to the estimate of the inverse temporal distortion function.

10. The system of claim 8, wherein the data symbols are estimated by using a channel equalizer.

11. The system of claim 10, wherein each output of the channel equalizer is phase-adjusted according to the estimate of the inverse temporal distortion function.

12. The system of claim 10, wherein each input to the channel equalizer is phase-adjusted according to the inverse temporal distortion function.

13. The system of claim 10, wherein the receiving unit comprises a multichannel receiver that receives a plurality of signals, the Doppler compensation unit comprises a plurality of units, and wherein a unit of the plurality of units is applied to a respective signal of the plurality of received signals of the multichannel receiver, the outputs of each of said plurality of units being used in a multi-channel equalizer to estimate the sequence of data symbols transmitted.

14. The system of claim 10, wherein the receiving unit comprises a multichannel receiver that receives a plurality of signals, the Doppler compensating unit comprises a plurality of units, and wherein a unit of the plurality of units is applied to a respective signal of the plurality of received signals of the multichannel receiver.

15. The system of claim 8, wherein the receiving unit comprises a multichannel receiver that receives a plurality of signals, the Doppler compensating unit comprises a plurality of units, and wherein a unit of the plurality of units is applied to a respective signal of the plurality of received signals of the multichannel receiver.

16. A Doppler compensation system, comprising:
a transmitting unit for transmitting a signal, wherein the transmitted signal being associated with an emission time-scale;
a receiving unit for receiving a signal, wherein the received signal is associated with a receive time-scale that is not equivalent to the emission time-scale; and
a Doppler compensating unit configured to estimate an inverse temporal distortion function that is a continuously varying function of time, wherein the inverse temporal distortion function is estimated on a sample-by-sample basis that is at a faster rate than that of a data symbol rate, wherein the Doppler compensating unit implements the inverse temporal distortion function to estimate the transmitted signal, wherein the inverse temporal distortion function utilizes an adjusted sampling rate.

17. A Doppler compensation method comprising:
transmitting a signal, wherein the transmitted signal includes a sequence of data symbols transmitted based on an emission time-scale;
receiving a signal, wherein the received signal is associated with a receive time-scale that is different from the emission time-scale; and
estimating sample times using a Doppler compensating unit for the received signal so that the received signal and the transmitted signal share the same time scale, wherein the Doppler compensating unit utilizes an inverse temporal distortion function that is continually estimated on a sample-by-sample basis and that is a continuously varying function of time, wherein the inverse temporal distortion function utilizes an adjusted sampling rate.

18. The method of claim 17, wherein the received signal is first sampled at a receiver nominal rate and then resampled dynamically according to the sample times from the Doppler compensating unit.

19. The method of claim 17, wherein an output of the Doppler compensating unit is used to estimate the transmitted data symbols.

20. The method of claim 19, wherein the Doppler compensating unit is adjusted dynamically based on the estimated data symbols.

21. The method of claim 20, wherein a re-sampling of the received signal is adjusted according to the output of the Doppler compensating unit.

22. The method of claim 21, wherein the dynamic adjustment is accomplished at a transmitted data symbol rate.

23. The method of claim 21, wherein the dynamic adjustment is faster than a transmitted data symbol rate.

24. The method of claim 17, wherein an equalizer is coupled to the Doppler compensating unit and an output of the Doppler compensating unit is used to estimate the transmitted data symbols, and wherein the adjusted sampling rate is adjusted according to an error measurement associated with a previously received sample.

25. An apparatus for Doppler compensation, comprising:
a Doppler compensating unit configured to estimate an inverse temporal distortion function on a sample-by-sample basis that is a continuously varying function of time, wherein the Doppler compensating unit implements the inverse temporal distortion function to estimate data symbols of a signal transmitted by a transmitting unit, wherein the inverse temporal distortion function utilizes an adjusted sampling rate; and
an equalizer for removing signal dispersion and multipath effects.

26. The apparatus of claim 25, wherein the transmitted data symbols represent data that has been protected by an error correction code.

27. The apparatus of claim 26, wherein the equalizer is followed by a decoder for said error correction code.

28. The apparatus of claim 27, wherein the Doppler compensating unit uses the estimates of the data symbols from the decoder.

29. The apparatus of claim 27, wherein the Doppler compensating unit uses symbol likelihoods or probabilities based on output of the decoder.

30. The apparatus of claim 29, wherein the Doppler compensation unit makes multiple passes over transmitted data blocks.

* * * * *